US010560632B2

(12) United States Patent
Wada

(10) Patent No.: US 10,560,632 B2
(45) Date of Patent: Feb. 11, 2020

(54) MOVING IMAGE REPRODUCING APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yuki Wada, San Jose, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 16/045,023

(22) Filed: Jul. 25, 2018

(65) Prior Publication Data

US 2019/0052806 A1 Feb. 14, 2019

(30) Foreign Application Priority Data

Aug. 9, 2017 (JP) ................................ 2017-154388

(51) Int. Cl.

*H04N 5/232* (2006.01)
*H04N 5/262* (2006.01)
*H04N 21/43* (2011.01)
*H04N 21/472* (2011.01)
*H04N 21/44* (2011.01)

(Continued)

(52) U.S. Cl.

CPC ......... *H04N 5/23254* (2013.01); *G11B 27/00* (2013.01); *H04N 5/23216* (2013.01); *H04N 5/23258* (2013.01); *H04N 5/23293* (2013.01); *H04N 5/23296* (2013.01); *H04N 5/268* (2013.01); *H04N 5/2628* (2013.01); *H04N 21/4314* (2013.01); *H04N 21/4316* (2013.01);

(Continued)

(58) Field of Classification Search

CPC ............... H04N 5/23254; H04N 5/268; H04N 5/23258; H04N 5/23296; H04N 21/4314; H04N 21/4316; H04N 5/23216; H04N 5/2628

See application file for complete search history.

(56) References Cited

U.S. PATENT DOCUMENTS

2003/0025812 A1* 2/2003 Slatter ................ H04N 5/23222 348/240.2
2014/0301665 A1* 10/2014 Saito .................... G06F 19/321 382/299

FOREIGN PATENT DOCUMENTS

JP H11331827 A 11/1999

* cited by examiner

*Primary Examiner* — Christopher K Peterson
(74) *Attorney, Agent, or Firm* — Rossi, Kimms & McDowell LLP

(57) ABSTRACT

A moving image reproducing apparatus is capable of enlarging and reproducing respective objects while keeping relation between the objects in a moving image. A first obtaining unit obtains position information about objects detected by a tracking unit. A calculation unit calculates distances between the objects based on the position information. A first decision unit decides a group to which each of the objects belongs based on a period during which the calculated distance is less than a threshold. A second decision unit decides a division number of a screen of a target frame corresponding to the number of groups. A selection unit selects a layout structure having divided screens corresponding to the division number. A third decision unit decides a layout of the groups to the divided screens of the selected layout structure. A reproduction unit reproduces the moving image while changing the target frame into the decided layout.

14 Claims, 8 Drawing Sheets

1000
1004 DISPLAY UNIT
1005 OPERATION UNIT
1006 NETWORK DEVICE
1001 CPU
1007 AUDIO OUTPUT UNIT
1002 PRIMARY STORAGE DEVICE
1003 SECONDARY STORAGE DEVICE

(51) Int. Cl.

| | |
|---|---|
| ***G11B 27/00*** | (2006.01) |
| ***H04N 5/268*** | (2006.01) |
| ***H04N 21/431*** | (2011.01) |

(52) U.S. Cl.
CPC ..... *H04N 21/44008* (2013.01); *H04N 21/472* (2013.01)

5001

5002 5003 5004

| OBJECT | OBJECT ID | CENTER COORDINATE (x,y) | OBJECT DISTANCE (z) |
|---|---|---|---|
| A | 1 | (300,300) | 70 |
| B | 2 | (500,200) | 80 |
| C | 3 | (700,350) | 60 |
| D | 4 | (1600,350) | 65 |
| E | 5 | (1800,300) | 70 |
| F | 6 | (1000,700) | 20 |

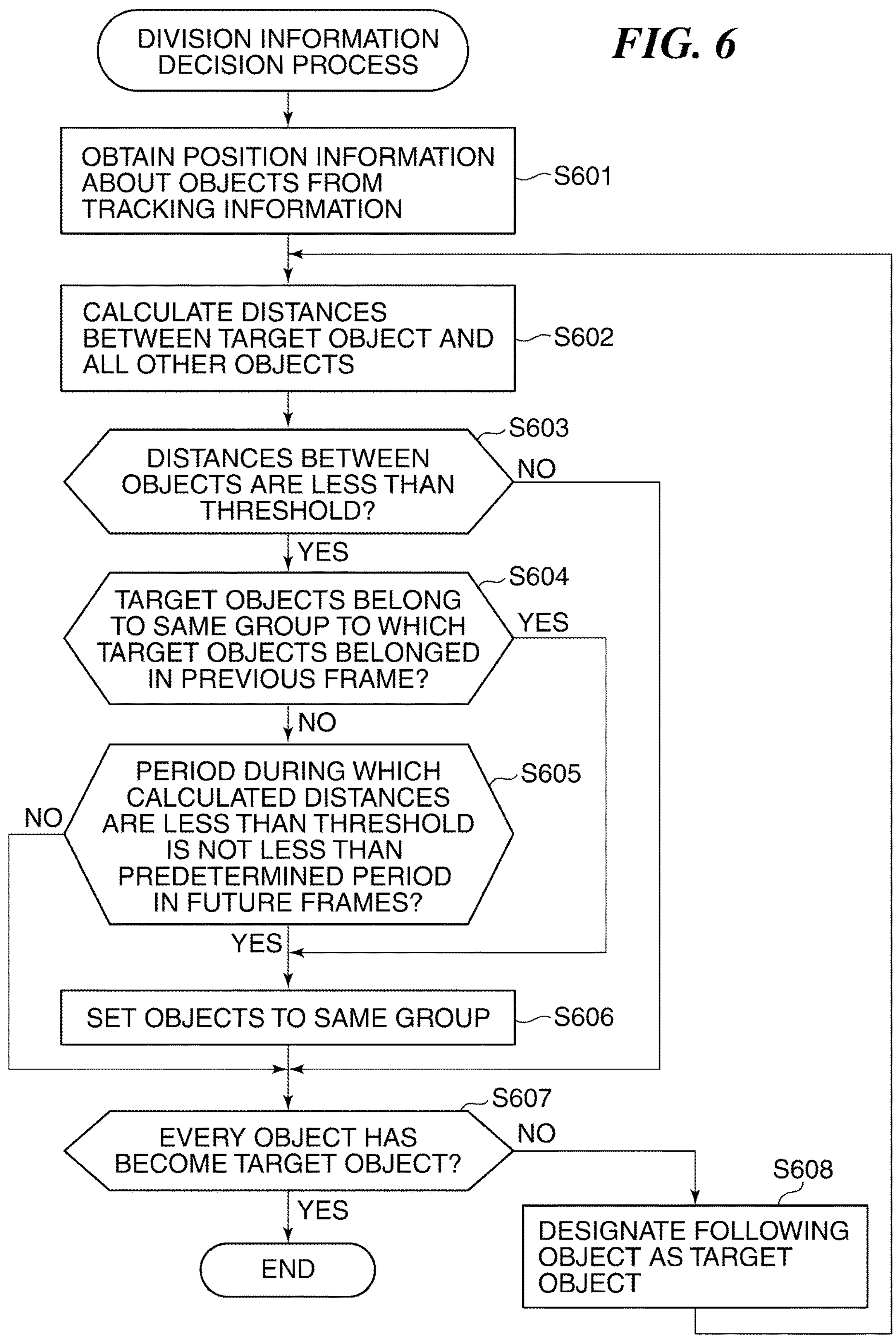
FIG. 6
DIVISION INFORMATION DECISION PROCESS
OBTAIN POSITION INFORMATION ABOUT OBJECTS FROM TRACKING INFORMATION
S601
CALCULATE DISTANCES BETWEEN TARGET OBJECT AND ALL OTHER OBJECTS
S602
S603
DISTANCES BETWEEN OBJECTS ARE LESS THAN THRESHOLD?
NO
YES
S604
TARGET OBJECTS BELONG TO SAME GROUP TO WHICH TARGET OBJECTS BELONGED IN PREVIOUS FRAME?
YES
NO
PERIOD DURING WHICH CALCULATED DISTANCES ARE LESS THAN THRESHOLD IS NOT LESS THAN PREDETERMINED PERIOD IN FUTURE FRAMES?
S605
NO
YES
SET OBJECTS TO SAME GROUP
S606
S607
EVERY OBJECT HAS BECOME TARGET OBJECT?
NO
YES
END
S608
DESIGNATE FOLLOWING OBJECT AS TARGET OBJECT

7001

| GROUP ID | CENTER COORDINATE (x, y) | OBJECT ID |
|---|---|---|
| 1001 | (500,283) | 1,2,3 |
| 1002 | (1700,325) | 4,5 |
| 1003 | (1000,700) | 6 |

7002 7003 7004

FIG. 11A
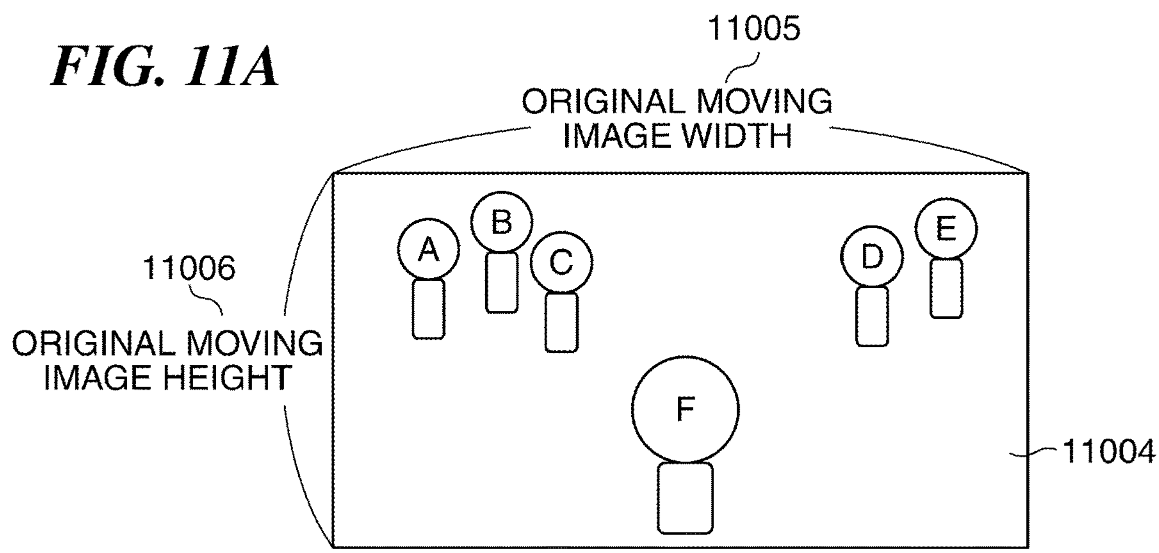
FIG. 11B
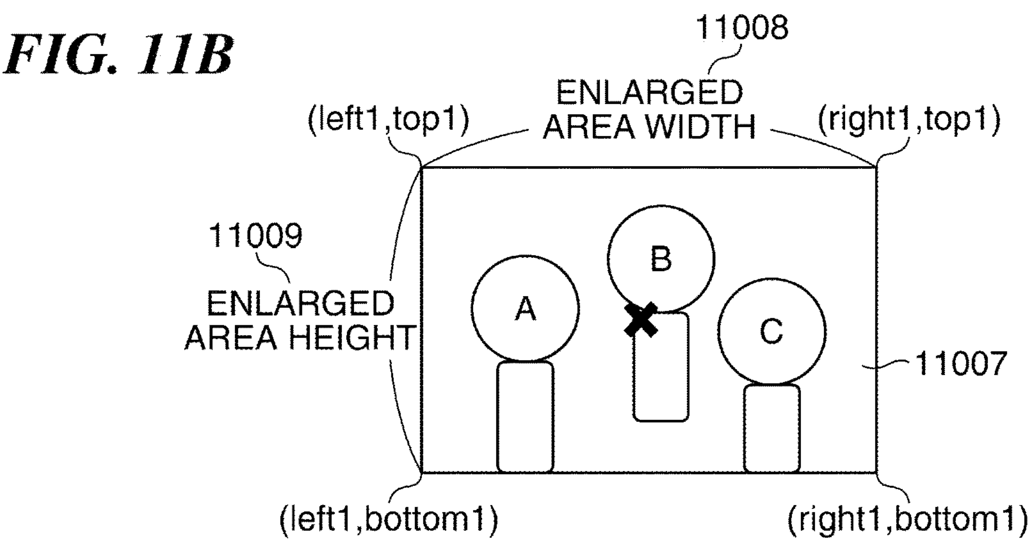
FIG. 11C
11001
11002 11003
| GROUP ID | RECTANGULAR AREA |
| --- | --- |
| 1001 | {left1,right1, bottom1,top1} |
| 1002 | {left2,right2, bottom2,top2} |
| 1003 | {left3,right3, bottom3,top3} |

MOVING IMAGE REPRODUCING APPARATUS, CONTROL METHOD THEREFOR, AND STORAGE MEDIUM STORING CONTROL PROGRAM THEREFOR

BACKGROUND OF THE INVENTION

Field of the Invention

The present invention relates to a moving image reproducing apparatus that reproduces a moving image, a control method therefor, and a storage medium storing a control program therefor.

Description of the Related Art

Cameras capable of filming moving images in 4K resolution are increasing rapidly in recent years. Moreover, it is expected that a moving image in 8K resolution can also be generally captured in near future. Thus, when a high resolution moving image in 4K or 8K can be captured, sufficient resolution will be obtained even if its part is enlarged. Accordingly, it is assumed that user needs to reproduce an enlarged moving image will increase in future.

Moreover, there is a known technique for displaying a composite image that consists of a plurality of screens divided for respective objects captured in a moving image on a monitor and for enlarging and reproducing an object displayed in one of the divided screens if needed (for example, see Japanese Laid-Open Patent Publication (Kokai) No. H11-331827 (JP H11-331827A)).

However, if an object in one of the screens divided for the respective objects is enlarged and reproduced, a facial expression of the object becomes clear, but relation between the objects becomes unclear. For example, when a moving image in which two children are playing is divided for the respective children and reproduced, or when newlywed couples are divided and reproduced, the relation between two persons, and the story of the moving image will become unclear.

SUMMARY OF THE INVENTION

The present invention provides a moving image reproducing apparatus, a control method therefor, and a storage medium storing a control program therefor, which are capable of enlarging and reproducing respective objects while keeping relation between the objects included in a moving image.

Accordingly, a first aspect of the present invention provides a moving image reproducing apparatus comprising a tracking unit configured to detect and track objects captured as a moving image, a change unit configured to change a magnification of the moving image, a first obtaining unit configured to obtain position information about the objects detected by the tracking unit, a calculation unit configured to calculate distances between the objects based on the position information, a first decision unit configured to decide a group to which each of the objects belongs based on a period during which the calculated distance is less than a threshold in the moving image, a second decision unit configured to decide a division number of a screen of a target frame corresponding to the number of groups decided, a selection unit configured to select a layout structure that is constituted by divided screens corresponding to the division number, a third decision unit configured to decide a layout of the groups to the divided screens of the selected layout structure, and a reproduction unit configured to reproduce the moving image while changing the target frame into the decided layout.

Accordingly, a second aspect of the present invention provides a moving image reproducing apparatus comprising a reproduction unit configured to reproduce a moving image in a predetermined area, a tracking unit configured to detect and track objects captured as a moving image, a change unit configured to change a magnification of the moving image, an enlargement unit configured to enlarge a target frame of the moving image on a basis of its center position corresponding to the magnification, a first decision unit configured to decide groups including groups to which all the objects in the predetermined area belong in a case where at least one of the objects in the target frame enlarged by the enlargement unit goes out from the predetermined area, a second decision unit configured to decide a division number of a screen of the target frame corresponding to the number of groups decided, a selection unit configured to select a layout structure that is constituted by divided screens corresponding to the division number, and a third decision unit configured to decide a layout of the groups to the divided screens of the selected layout structure. The reproduction unit reproduces the moving image while changing the target frame into the decided layout.

Accordingly, a third aspect of the present invention provides a control method for a moving image reproducing apparatus that is provided with a tracking unit that detects and tracks objects captured as a moving image and a change unit that changes a magnification of the moving image, the control method comprising a first obtaining step of obtaining position information about the objects detected by the tracking unit, a calculation step of calculating distances between the objects based on the position information, a first decision step of deciding a group to which each of the objects belongs based on a period during which the calculated distance is less than a threshold in the moving image, a second decision step of deciding a division number of a screen of a target frame corresponding to the number of groups decided, a selection step of selecting a layout structure that is constituted by divided screens corresponding to the division number, a third decision step of deciding a layout of the groups to the divided screens of the selected layout structure, and a reproduction step of reproducing the moving image while changing the target frame into the decided layout.

Accordingly, a fourth aspect of the present invention provides a control method for a moving image reproducing apparatus that is provided with a reproduction unit that reproduces a moving image in a predetermined area, a tracking unit that detects and tracks objects captured as a moving image, and a change unit that changes a magnification of the moving image, the control method comprising an enlargement step of enlarging a target frame of the moving image on a basis of its center position corresponding to the magnification, a first decision step of deciding groups including groups to which all the objects in the predetermined area belong in a case where at least one of the objects in the target frame enlarged by the enlargement unit goes out from the predetermined area, a second decision step of deciding a division number of a screen of the target frame corresponding to the number of groups decided, a selection step of selecting a layout structure that is constituted by divided screens corresponding to the division number, a third decision step of deciding a layout of the groups to the divided screens of the selected layout structure, and a reproduction step of reproducing the moving image while changing the target frame into the decided layout.

Accordingly, a fifth aspect of the present invention provides a non-transitory computer-readable storage medium storing a control program causing a computer to execute the control method of the third aspect.

Accordingly, a sixth aspect of the present invention provides a non-transitory computer-readable storage medium storing a control program causing a computer to execute the control method of the fourth aspect.

According to the present invention, the respective objects are enlarged and reproduced while keeping the relation between the objects included in the moving image.

Further features of the present invention will become apparent from the following description of exemplary embodiments with reference to the attached drawings.

BRIEF DESCRIPTION OF THE DRAWINGS

FIG. 6 is a flowchart showing procedures of a division information decision process in step S304 in FIG. 3 according to the first embodiment.

FIG. 8 is a flowchart showing procedures of a layout decision process in step S305 in FIG. 3.

FIG. 11A, FIG. 11B, and FIG. 11C are views for describing a method for deciding an enlarged area width of each area when objects of respective groups are laid out to respective divided screens in FIG. 10.

DESCRIPTION OF THE EMBODIMENTS

Hereafter, embodiments according to the present invention will be described in detail with reference to the drawings. It should be noted that the following embodiments do not restrict the scope of the present invention defined by the claims. All the combinations of features described in the following embodiments are not necessarily indispensable to the solutions of the present invention.

Figure 1:
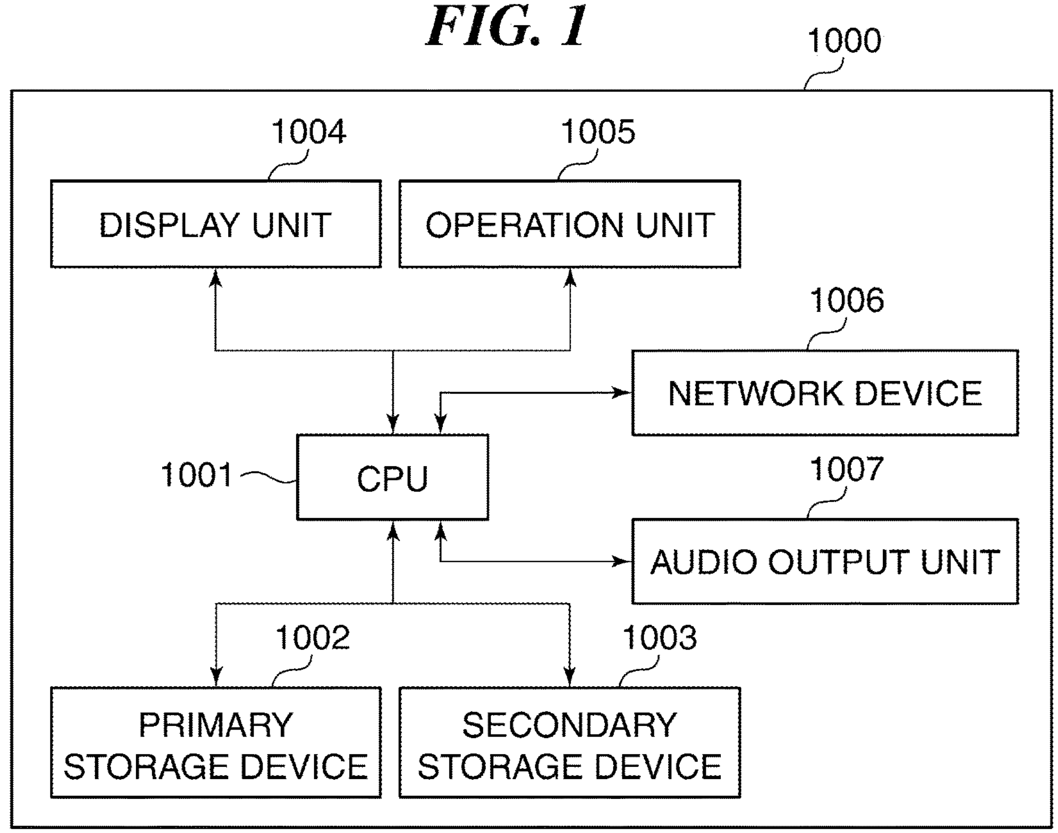
FIG. 1 is a block diagram schematically showing a hardware configuration of a moving image reproducing apparatus according to a first embodiment.

FIG. 1 is a block diagram schematically showing a hardware configuration of a moving image reproducing apparatus according to a first embodiment. In the description, the moving image reproducing apparatus should include the following hardware configuration and reproduce a moving image in user interfaces in FIG. 2A and FIG. 2B mentioned later, and a PC, a mobile device, etc. are exemplified.

The moving image reproducing apparatus 1000 consists of a CPU 1001, a primary storage device 1002, a secondary storage device 1003, a display unit 1004, an operation unit 1005, a network device 1006, and an audio output unit 1007.

The CPU 1001 controls various kinds of calculations and parts constituting the moving image reproducing apparatus 1000 according to an input signal and a program including the below-mentioned moving image reproduction application (hereinafter referred to as a program). The primary storage device 1002 stores temporary data and is used as a working space of the CPU 1001. The secondary storage device 1003 stores programs for controlling the moving image reproducing apparatus 1000 and various kinds of setting information.

The display unit 1004 displays an image, characters for an interactive operation, etc. It should be noted that display unit 1004 is a display device like an LCD. Moreover, the moving image reproducing apparatus 1000 does not need to be provided with the display unit 1004, and the moving image reproducing apparatus 1000 should just have a display control function that controls display of the display unit 1004.

The operation unit 1005 receives a user's operation. The operation unit 1005 is capable of employing a keyboard, a mouse, a touch panel, etc.

The network device 1006 connects to an external apparatus and sends and receives a control command and data. For example, PTP (Picture Transfer Protocol) and MTP (Media Transfer Protocol) are used as protocols for establishing and performing data communication. It should be noted that the network device 1006 may communicate by a wired connection like a USB (Universal Serial Bus) cable. Moreover, the communicate may be performed by a wireless connection like a wireless LAN. Moreover, the network device 1006 may connect to the external apparatus directly or may connect to the external apparatus through a network like the Internet or a server.

The audio output unit 1007 is a loudspeaker etc. that outputs audio.

Figure 2A:
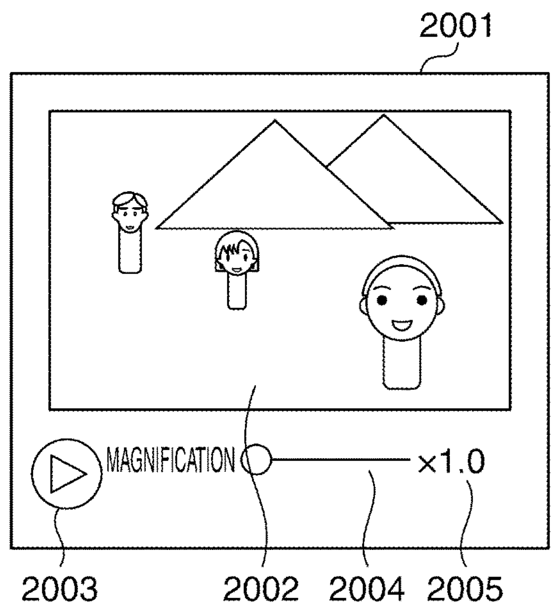
FIG. 2A and FIG. 2B are views for describing user interfaces of a moving image reproduction application executed on the moving image reproducing apparatus in FIG. 1.

FIG. 2A and FIG. 2 are views for describing user interfaces of a moving image reproduction application executed on the moving image reproducing apparatus 1000 in FIG. 1.

Figure 2B:
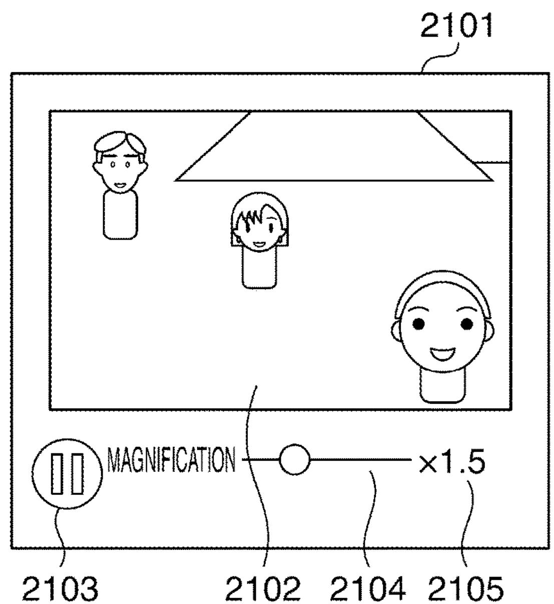

FIG. 2A shows a user interface 2001 in which a moving image is displayed in the equal magnification. FIG. 2B shows a user interface 2101 in which the moving image is enlarged and displayed.

As shown in FIG. 2A, the user interface 2001 includes an area (a view: a predetermined area) 2002 in which the moving image is reproduced and a play button 2003 for a moving image. Press of the play button 2003 will start reproduction of a moving image. During reproduction, the play button 2003 is switched to a pause button 2103 as shown in FIG. 2B. Furthermore, the user interface 2001 includes a slider bar 2004 that changes a magnification of a moving image, and a magnification display part 2005 that shows the current magnification. In the example in FIG. 2A, the magnification display part 2005 shows that the magnification is 1.0 time (equal magnification) and the moving image is not enlarged.

In FIG. 2B, the moving image is enlarged and reproduced in an area (view) 2102 in which a moving image is reproduced. Press of the pause button 2103 suspends a moving image under reproduction. During suspension, the pause button 2103 is switched to the play button 2003. Furthermore, the user interface 2101 includes a slider bar 2104 that is used for changing a magnification of a moving image, and a magnification display part 2105 that shows the current magnification. In the example in FIG. 2B, the magnification display part 2005 shows that the moving image is enlarged by 1.5 times and displayed.

Figure 3:
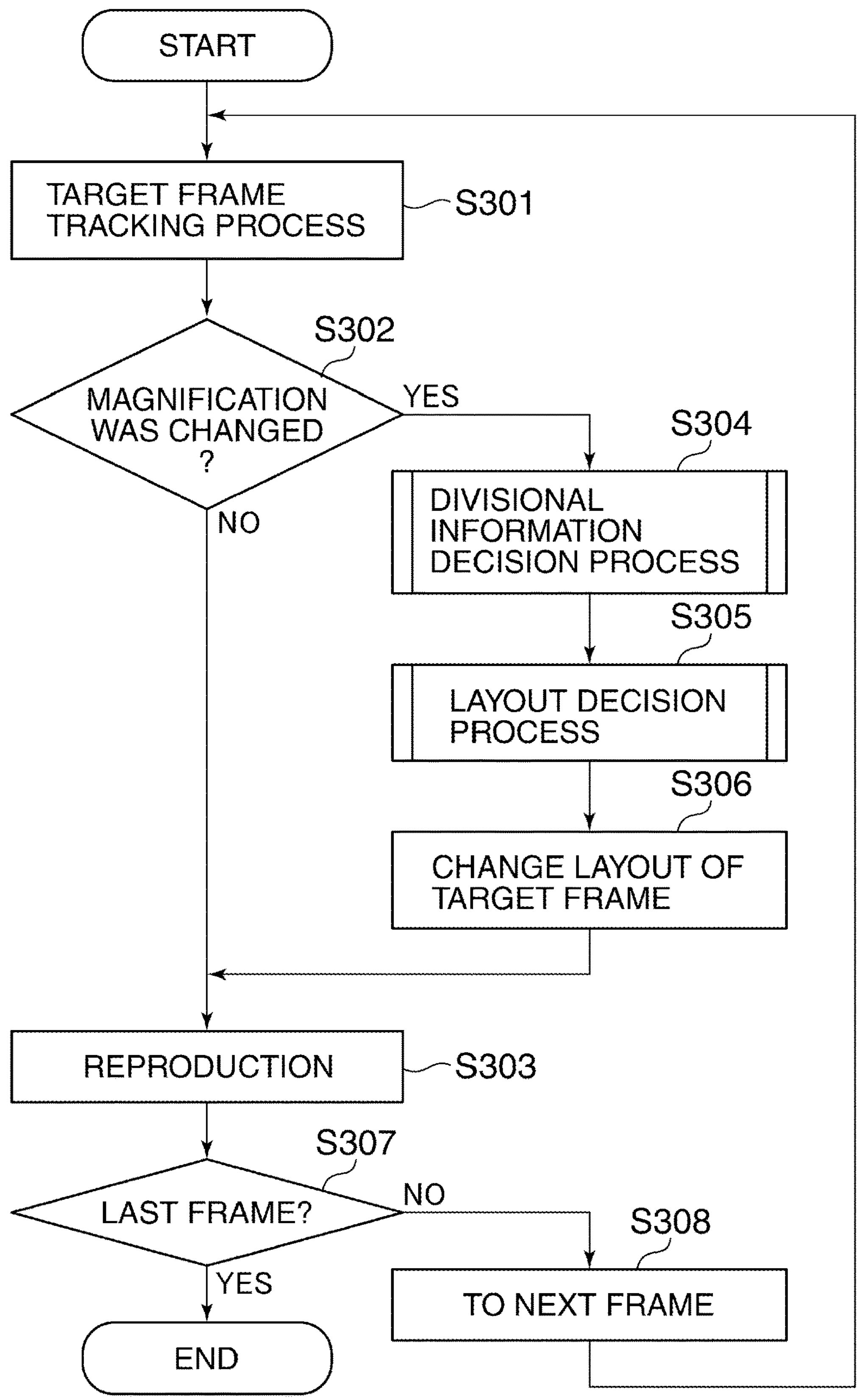
FIG. 3 is a flowchart showing procedures of the entire process of the moving image reproduction including moving image tracking, moving image layout, and reproduction according to the first embodiment.

FIG. 3 is a flowchart showing procedures of the entire process of the moving image reproduction including moving image tracking, moving image layout, and reproduction according to the first embodiment. This process is executed when the CPU 1001 executes the moving image reproduction application stored in the secondary storage device 1003.

In the first embodiment, although this process shall be performed for all frames of a moving image, a tracking process etc. may be performed by thinning every other frame and a thinned frame may be interpolated from the tracking information about previous and next frames.

The CPU 1001 selects one of the frames of the moving image that are currently reproducing as a target frame in step S301 first, performs the tracking process for an object in the target frame, and records tracking information showing a tracking result. Moreover, when there are a plurality of objects in the target frame, the CPU 1001 executes the tracking process for each object. In the description, the tracking process is a general method that performs a face detection process when a target is a face, and performs a template matching process when a target is other than a face. Since tracking information about frames temporally of the future as compared with the target frame is also used, the tracking process is performed as an asynchronous process for an object in a feature frame and records the tracking information about the future frame.

This tracking information will be described with reference to FIG. 4 and FIG. 5.

Figures 4, 5:
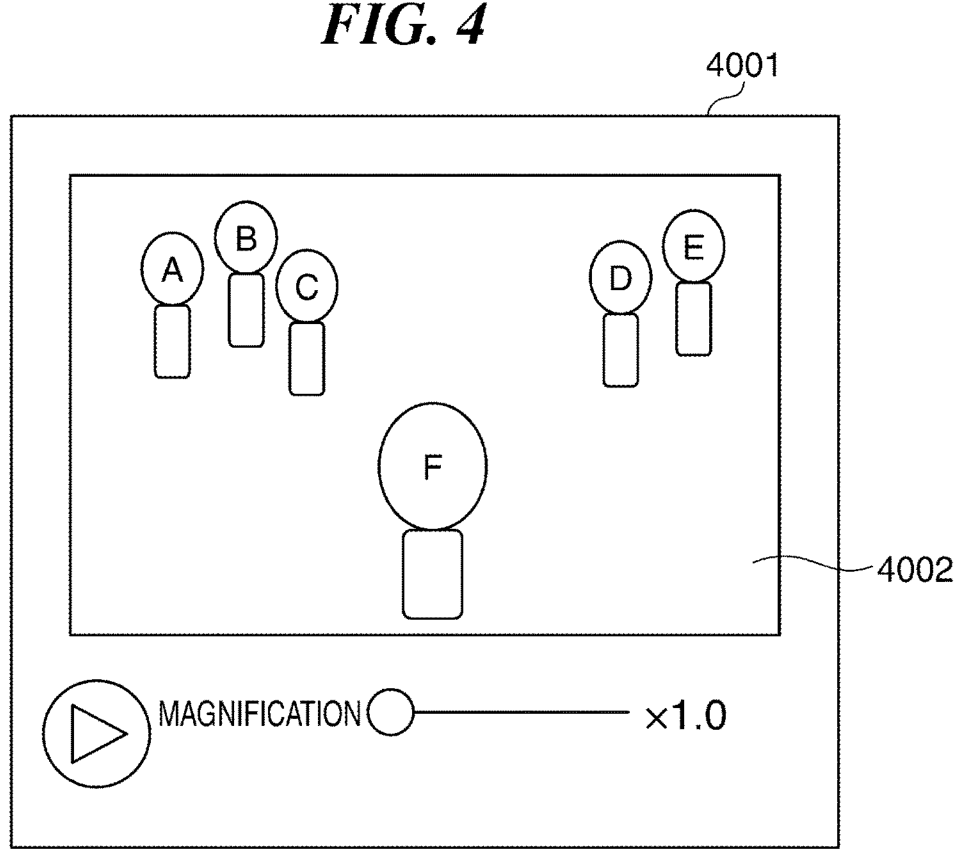
FIG. 4 is a view showing a user interface in which a moving image including a plurality of objects is reproducing in equal magnification according to the first embodiment.
FIG. 5 is a view showing a data structure of tracking information about a target frame in the moving image that is reproducing in the user interface in FIG. 4.

FIG. 4 is a view showing a user interface 4001 in which a moving image including a plurality of objects is reproducing in equal magnification according to the first embodiment.

As shown in FIG. 4, six person objects A-F are included in a view area 4002 of a target frame.

FIG. 5 is a view showing a data structure of tracking information about the target frame in the moving image that is reproducing in the user interface 4001 in FIG. 4.

The tracking information 5001 is constituted from columns 5002, 5003, and 5004 that respectively store object IDs, center coordinates (position information), and object distances of the respective objects A through F included in the target frame.

Mutually different values are assigned to the respective objects A through F that are detected in the tracking process in the step S301 as the object IDs shown in the column 5002. When the same object ID is assigned to objects in different frames, the objects are determined as the same object. It is determined whether the objects are the same object in the step S301 of the tracking process using face similarity information or similarity information about template matching.

The center coordinates shown in the column 5003 are coordinate values that show the positions of the respective objects A through F in the target frame. Specifically, a center coordinate of a face detection frame or a template frame is calculated as the center coordinate. A center coordinate is denoted by a coordinate system in which a horizontal direction of a frame is an x-axis and a vertical direction is a y-axis. The larger an x value is, the more right the position is within a frame. And the larger an y value is, the more upper the position is within a frame.

The object distances shown in the column 5004 are distances from a camera (not shown) that captures the moving image to the respective objects A through F. That is, the shorter the object distance is, the nearer the object to the camera is. The object distance is obtained when the moving image is captured by a multi-eye camera etc.

Since the number of objects in a moving image varies as time elapses, the tracking information is obtained for every frame of the moving image as follows in the first embodiment. Specifically, when a new object comes in the frame, it is determined that the number of objects increases, and a new object ID is created in the column 5002. In the meantime, when an object goes out from the frame or the tracking process for any object fails, it is determined that the number of objects decreases, and the center coordinate and object distance about the object concerned in the columns 5003 and 5004 in the tracking information 5001 in FIG. 5 are cleared so as to be blank.

Next, the CPU 1001 determines whether the user changed the magnification in step S302. The user is able to change the magnification by manipulating the slide bar 2004 in FIG. 2. When determining that the magnification was not changed in the step S302, the CPU 1001 proceeds with the process to step S303 and reproduces the moving image without dividing the frame into areas for respective groups. In the meantime, when determining that the magnification was changed in the step S302, the CPU 1001 executes a division information decision process mentioned later in FIG. 6 in step S304.

In step S305, the CPU 1001 executes a layout decision process mentioned later in FIG. 8 on the basis of division information decided in the step S304.

In step S306, the CPU 1001 reproduces the moving image in the step S303 after changing the layout of the target frame into the layout determined in the step S305. After that, the CPU 1001 determines whether the target frame is the last frame in step S307. When it is the last frame, the CPU 1001 finishes this process as is. When it is not the last frame, the CPU 1001 proceeds with the process to step S308, changes the target frame to the next frame, and returns the process to the step S301.

FIG. 6 is a flowchart showing procedures of the division information decision process in the step S304 in FIG. 3 according to the first embodiment.

The CPU 1001 first obtains the position coordinates of the respective objects included in the target frame from the tracking information 5001 in step S601. Moreover, the CPU 1001 selects one of the objects included in the target frame as a target object.

In the next step S602, the CPU 1001 calculates the distances between the target object and all the other objects. For example, when the target object is the object A in FIG. 5, a distance between the object A and object B, a distance between the object A and object C, a distance between the object A and object D, a distance between the object A and object E, and a distance between the object A and object F are calculated. In the description, the distances are calculated on a two-dimensional plane on the basis of the center coordinates shown in the column 5003. However, the calculation is not limited to this. For example, a distance may be calculated in a three-dimensional space including an object distance shown in the column 5004 or a distance may be calculated on the basis of only an object distance shown in the column 5004.

In step S603, the CPU 1001 checks whether the distances between the objects calculated in the step S602 are less than a threshold. When the distances are less than the threshold, the process proceeds to step S604. Hereinafter, a plurality of objects of which the calculated distances are less than the threshold is referred to as target objects that belong to a group.

In the step S604, the CPU 1001 determines whether the target objects belong to the same group to which the target objects belonged in the previous frame. As a result of the determination, when the target objects belong to the same group (YES in the step S604), the CPU 1001 proceeds with the process to step S606 and sets the target objects to the same group. For example, when the object IDs 1 and 2 are assigned to the target objects in the current N-th frame, and when it was determined that the target objects to which the object IDs 1 and 2 were assigned belonged to the same group in the previous (N−1)th frame, the CPU 1001 sets the target objects to the same group. In addition, when three or more objects are ascertained as the target objects in the step S603, the determination in the step S604 is performed similarly. For example, when the object IDs 1, 2, and 3 are assigned to the target objects in the N-th frame, and when it was determined that the target objects to which the object IDs 1, 2, and 3 were assigned belonged to the same group in the (N−1)th frame, the CPU 1001 sets the target objects to the same group.

In the meantime, when the target objects do not belong to the same group in step S604 (NO in the step S604), the process proceeds to the step S605. In the step S605, the CPU 1001 calculates the distances between the target object and the other target objects from the tracking information about frames temporally of the future and determines whether a period during which the calculated distances are less than the threshold is not less than a predetermined period. As a result of this determination, when the period during which the distances between the objects are less than the threshold is not less than the predetermined period (YES in the step S605), the process proceeds to the step S606. In the step S606, the CPU 1001 generates a new group for the target object and the other target objects of which the distances from the target object are less than the threshold and sets the target objects to the generated same group. For example, when the predetermined period is set to 2 seconds, the tracking information about the moving image during 2 seconds, for example, the tracking information about (N+1) th frame to (N+120)th frame of the moving image of 60 fps, is ascertained, and it is determined whether the distances between the objects are less than the threshold in all these frames. This is for preventing the moving image from becoming difficult to see when division of a frame is released immediately after the frame is divided in a scene where objects repeatedly become near and far. In the meantime, when the period during which the distances between the objects are less than the threshold is less than the predetermined period (NO in the step S605), the process proceeds to step S607.

In the step S607, the CPU 1001 determines whether every object has become a target object and has been compared with the other objects. As a result of this determination, when every object has become a target object and has been compared (YES in the step S607), this process is finished as is. Otherwise (NO in the step S607), the process proceeds to step S608. In the step S608, the CPU 1001 designates the object to which the following object ID was assigned as a target object and returns the process to the step S602. Specifically, the CPU 1001 first designates the object to which the object ID 1 was assigned as a target object, calculates distances between the target object and the objects to which the object IDs 2 through 6 were assigned, and performs the process in the steps S603 through S607. Next, the CPU 1001 designates the object to which the object ID 2 was assigned as a target object in the step S608, calculates distances between the target object and the objects to which the object IDs 3 through 6 were assigned, and performs the process in the steps S603 through S607.

Figure 7:
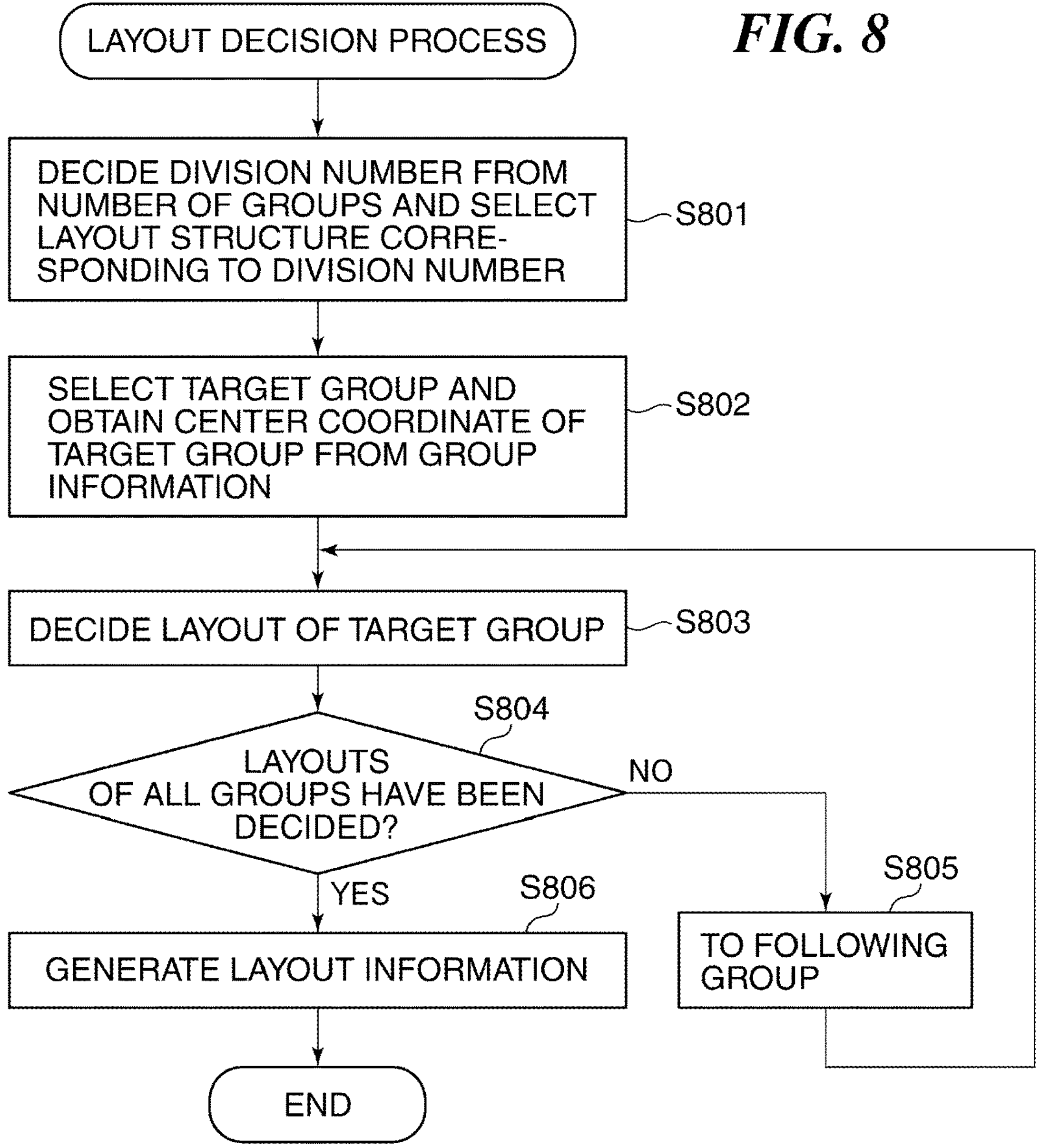
FIG. 7 is a view showing a data structure of group information according to the first embodiment.

FIG. 7 is a view showing a data structure of group information according to the first embodiment.

The group information 7001 is constituted from group IDs in a column 7002, group's center coordinates (enlargement center positions) in a column 7003, and IDs of objects that belong to groups in a column 7004 for the respective groups generated in the step S606.

The column 7002 stores group IDs of the number of groups. Moreover, the column 7003 stores an average of the center coordinates of the objects whose IDs are 1, 2, and 3 calculated as the center coordinate of the group whose ID is 1001.

FIG. 8 is a flowchart showing procedures of a layout decision process in the step S305 in FIG. 3.

Figure 9:
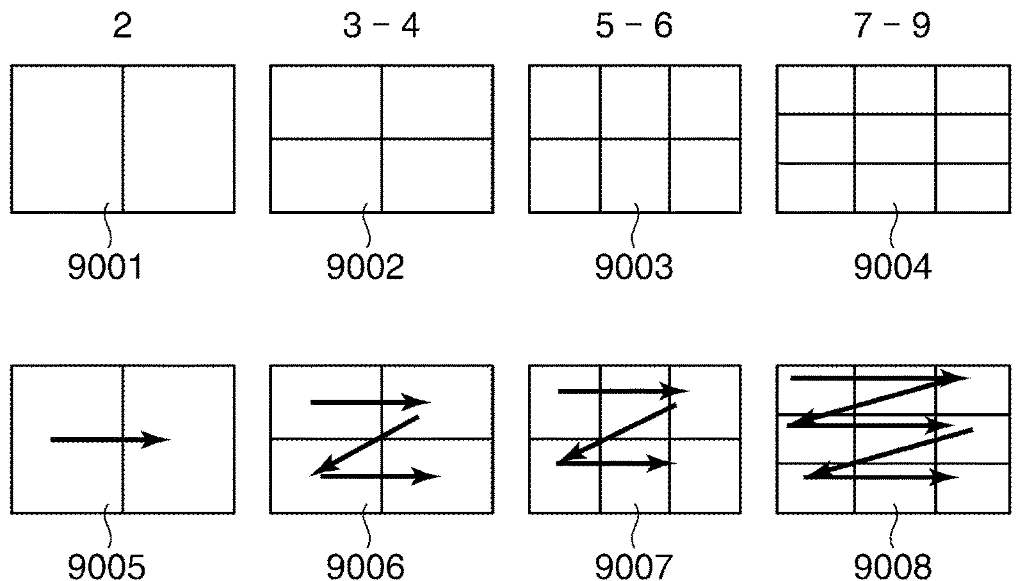
FIG. 9 is a view showing layout structures corresponding to the division numbers determined in step S801 in FIG. 8.

The CPU 1001 decides a division number from the number of groups in step S801. In the first embodiment, as shown in FIG. 9, layout structures each of which consists of a plurality of divided screens (layout frames) corresponding to the division number are beforehand stored as templates. For example, when the number of groups is 2, a layout structure that has two divided screens as shown by a template 9001 is selected in the step S801. Similarly, when the number of groups is 3 or 4, a layout structure having divided screens as shown by a template file 9002 is selected in the step S801. When the number of groups is 5 or 6, a template file 9003 is selected, and when the number of groups is 7, 8, or 9, a template file 9004 is selected. Although the equally-divided templates that are held beforehand are used in the first embodiment, size of divided area may be changed according to size of an object.

In the next step S802, the CPU 1001 selects one of the groups about which information is recorded in the group information 7001 as a target group and obtains the center coordinate of the target group from the group information 7001. In the first embodiment, the group to which the smallest group ID 1001 is assigned is selected as the target group.

The CPU 1001 decides a layout of the target group in step S803. The groups are arranged in the order shown by arrows 9005 through 9008 on the basis of the center coordinate shown in the column 7003 so that the positions of the decided layouts will be near the original positions of the objects as much as possible. Since the number of groups is 3 in the case of the case of the group information 7001, the layout structure of the template 9002 is selected in the step S801. Moreover, since the group whose center coordinate is in the leftmost in the group information 7001 is the group of the group ID 1001, the objects of this group are arranged in the upper-left layout frame in the template 9002. Next, since the group whose center coordinate is in the rightmost in the group information 7001 is the group of the group ID 1002, the objects of this group are arranged in the upper-right layout frame in the template 9002. Similarly, the objects of the group of the group ID 1003 are arranged the lower left layout frame in the template 9002. Since the number of groups is 3 but the number of layout frames is 4, the target frame preceding the layout change may be reduced and arranged in the lower-right layout frame. This enables a user to grasp the entire view of the moving image.

Figure 10:
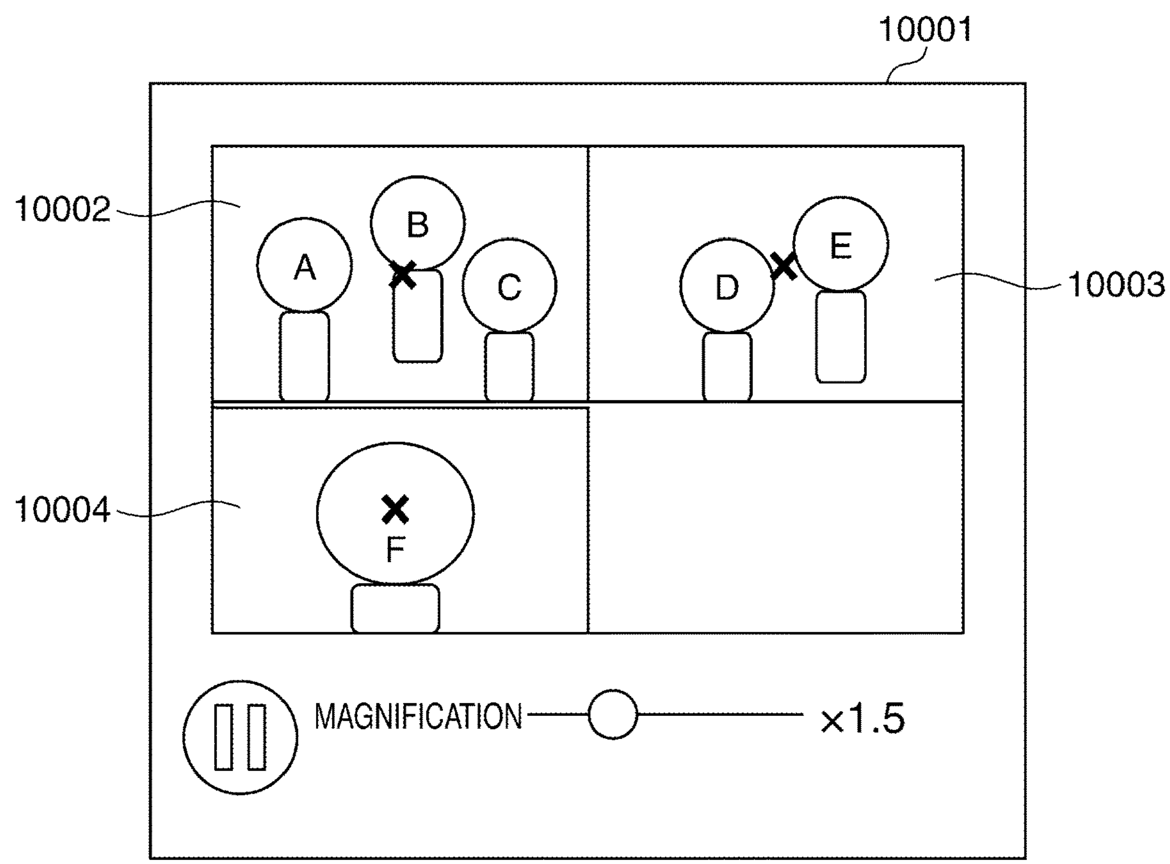
FIG. 10 is a view showing a user interface displayed when a user gives enlargement instruction for the moving image under reproduction in FIG. 4.

FIG. 10 is a view showing a user interface 10001 displayed when a user gives enlargement instruction for the moving image under reproduction in FIG. 4.

In the user interface 10001, the objects of the groups of the group IDs 1001, 1002, and 1003 in FIG. 7 are respectively arranged in the divided screens 10002, 10003, and 10004, and the target frame is being reproduced.

FIG. 11A, FIG. 11B, and FIG. 11C are views for describing a method for deciding an enlarged area width of each area when objects of respective groups are laid out to respective divided screens 10002 through 10004 in FIG. 10.

An original frame 11004 of the moving image shown in FIG. 11A is a target frame that is subjected to enlargement instruction by a user, and the size is shown by an original moving image width 11005 and an original moving image height 11006. Moreover, as shown in FIG. 11B, size of a divided screen 11007 in which the objects included in the group of the group ID 1001 in FIG. 7 are laid out is shown by an enlarged area width 11008 and an enlarged area height 11009. The enlarged area width 11008 and the enlarged area height 11009 are decided according to the template selected in the step S801. For example, in the case in FIG. 10, when the original moving image width 11005 shall be x, the enlarged area width 11008 will be calculated as x/2, and when the original moving image height 11006 shall be y, the enlarged area height 11009 will be calculated as y/2. As a result of this, coordinate information {left1, right1, bottom1, top1} about a rectangular area in which the objects included in the group of the group ID 1001 in FIG. 7 are laid out is calculated according to the center coordinate, enlarged area width, and enlarged area height. Each group is arranged in each rectangular area by enlarging the target frame at the magnification instructed by the user centering the center coordinate so that the center coordinate will match the center of the rectangular area. At this time, the protruded area of the enlarged target frame from the rectangular area is trimmed (cut).

When a center coordinate shown in the column 7003 is located near an end of the view area 4002 in which a moving image is reproduced, the width and height of the rectangular area may be more than the original moving image width and original moving image height or the values of left1 and bottom1 may be less than 0. In such a case, the values are replaced with the maximum and minimum values that do not exceed the view area. For example, when left1 becomes negative, it is replaced with 0 and right1 is taken as a value of the enlarged area width.

As shown in FIG. 11C, the coordinate information 11001 about the areas in which the objects included in the respective groups in FIG. 7 are laid out is constituted from a column 11002 showing group IDs and a column 11003 showing coordinate information about the rectangular areas in which the objects included in the respective groups are laid out.

Referring back to FIG. 8, the CPU 1001 determines whether every group has been the target group and the layouts of all the groups have been decided in step S804. As a result of the determination, when every group has been the target group and the layouts of all the groups have been decided (YES in the step S804), the process proceeds to step S806, otherwise (NO in the step S804), the process proceeds to step S805. In the step S805, the CPU 1001 designates the group to which the following group ID was assigned as a target group and returns the process to the step S803.

In the step S806, the CPU 1001 generates the layout information about the decided layouts of all the groups and finishes this process.

In the first embodiment, when the magnification is changed in the step S302 in FIG. 3, a plurality of objects included in the target frame are divided into a plurality of groups by the process shown in FIG. 6. As compared with this, in a second embodiment, when a user changes magnification, the target frame is enlarged to the magnification on the basis of the center position as mentioned below. At this time, when at least one of objects in the target frame goes out from the view area 4002 of the user interface in which the moving image is reproduced, a plurality of objects included in the target frame are divided into a plurality of groups.

Figure 12:
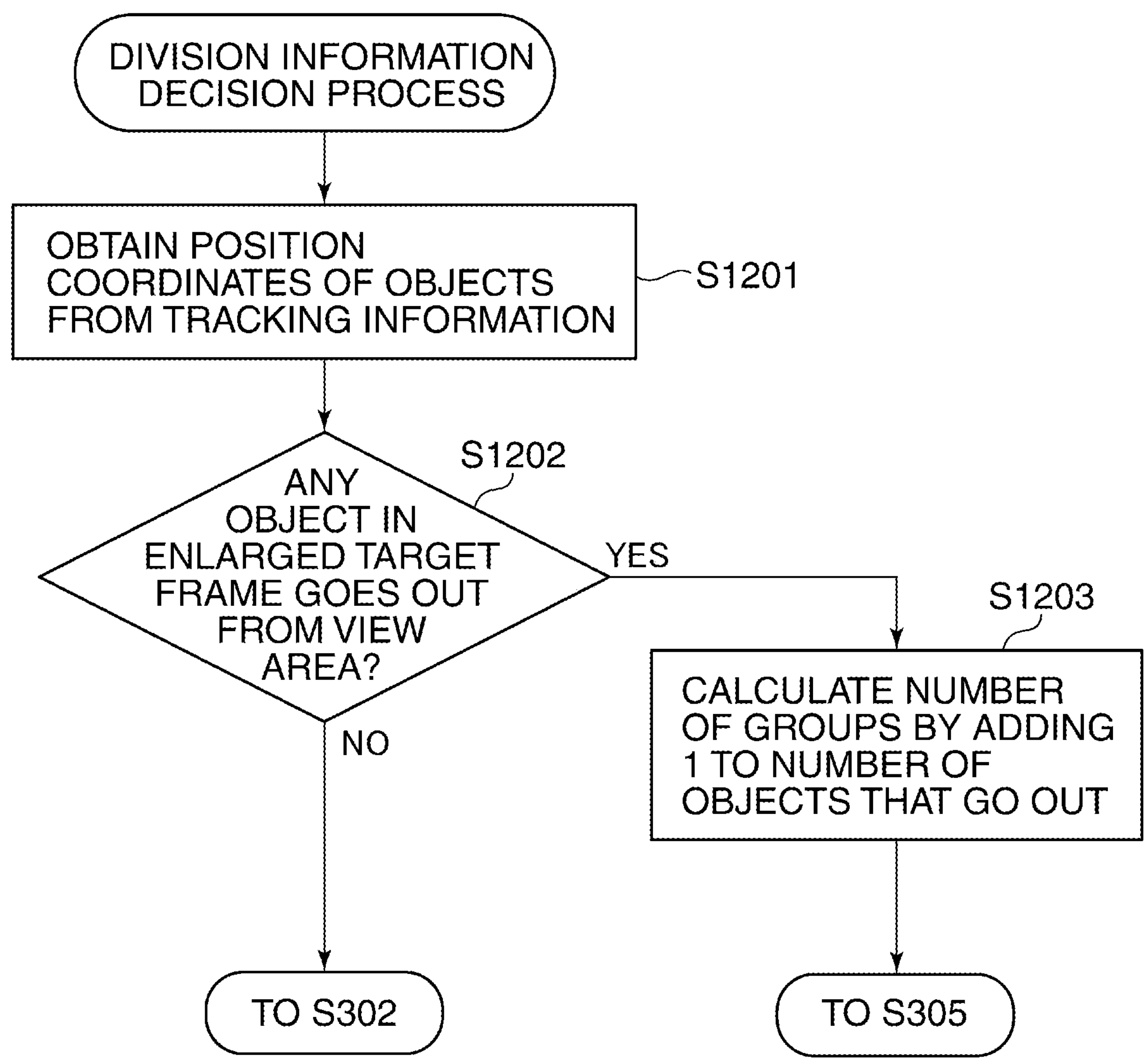
FIG. 12 is a flowchart showing procedures of a division information decision process in step S304 in FIG. 3 according to a second embodiment.

FIG. 12 is a flowchart showing procedures of a division information decision process in the step S304 in FIG. 3 according to the second embodiment.

The CPU 1001 first obtains the position coordinates of the objects from the tracking information 5001 in step S1201.

Next, the CPU 1001 enlarges the target frame on the basis of the center position at the magnification obtained in the step S302 and determines whether any object goes out from the view area 4002 of the user interface in which the moving image is reproduced in step S1202. As a result of this determination, when any object goes out from the view area, the CPU 1001 proceeds with the process to step S1203, calculates the number of all groups by adding 1 to the number of objects that go out, and proceeds with the process to the step S305 in FIG. 3. In the meantime, when no object goes out, the CPU 1001 returns the process to the step S302 in FIG. 3.

In the second embodiment, the CPU 1001 determines whether an object goes out from the view area 4002 by determining whether the center coordinate of the object shown in the column 5003 in FIG. 5 goes outside the view area 4002. However, the present invention is not limited to the above-mentioned method. For example, it may be determined by determining whether a face detection frame to an object or a frame of template matching goes outside the view area 4002.

In addition, the method for deciding the number of groups is not limited to the method in the step S1203 as long as the method decides a plurality of groups including groups to which objects in the view area 4002 belong when a target frame is enlarged. For example, when objects of which positions are mutually near go out (i.e., when there are objects whose distance is not more than a threshold among objects that go out), these objects may belong to the same group. Moreover, in such a case, when the distance between the objects becomes more than the threshold in a subsequent frame, the above-mentioned decided group may be divided and the objects may belong to respectively different groups.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)*), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-154388, filed Aug. 9, 2017, which is hereby incorporated by reference herein in its entirety.

What is claimed is:

1. A moving image reproducing apparatus comprising:

a tracking unit configured to detect and track objects captured as a moving image;

a change unit configured to change a magnification of the moving image;

a first obtaining unit configured to obtain position information about the objects detected by the tracking unit;

a calculation unit configured to calculate distances between the objects based on the position information;

a first decision unit configured to decide a group to which each of the objects belongs based on a period during which the calculated distance is less than a threshold in the moving image;

a second decision unit configured to decide a division number of a screen of a target frame corresponding to the number of groups decided;

a selection unit configured to select a layout structure that is constituted by divided screens corresponding to the division number;

a third decision unit configured to decide a layout of the groups to the divided screens of the selected layout structure; and a reproduction unit configured to reproduce the moving image while changing the target frame into the decided layout.

2. The moving image reproducing apparatus according to claim 1, further comprising a fourth decision unit configured to decide enlarged center positions of the groups in the target frame, wherein the third decision unit decides the layout corresponding to the enlargement center positions of the groups and arrangement positions of the divided screens in the layout structure.

3. The moving image reproducing apparatus according to claim 2, further comprising a trimming unit configured to trim protruded areas of enlarged target frames from the decided divided screens in a case where the groups are laid out to the decided divided screens by enlarging the target frame at the magnification centering the respective enlarged center positions and by arranging the enlarged target frames so that the enlarged center positions will respectively match the centers of the decided divided screens, wherein the reproduction unit arranges the groups of which the protruded areas are trimmed to the decided divided screens and reproduces them.

4. The moving image reproducing apparatus according to claim 1, wherein the tracking unit detects the number of objects included in the target frame among the objects.

5. The moving image reproducing apparatus according to claim 1, wherein the tracking unit is provided with a determination unit configured to determine whether objects in different frames of the moving image are the same object according to face similarity information, and wherein the first obtaining unit obtains center coordinates of face detection frames to the objects as the position information about the objects.

6. The moving image reproducing apparatus according to claim 1, wherein the tracking unit is provided with a determination unit configured to determine whether objects in different frames of the moving image are the same object according to similarity information about template matching, and wherein the first obtaining unit obtains center coordinates of template frames to the objects as the position information about the objects.

7. The moving image reproducing apparatus according to claim 5, wherein the tracking unit is provided with a second obtaining unit configured to obtain distances to the objects from a camera that captures the moving image, and wherein the first obtaining unit further obtains the distances obtained by the second obtaining unit as the position information about the objects.

8. The moving image reproducing apparatus according to claim 6, wherein the tracking unit is provided with a second obtaining unit configured to obtain distances to the objects from a camera that captures the moving image, and wherein the first obtaining unit further obtains the distances obtained by the second obtaining unit as the position information about the objects.

9. A moving image reproducing apparatus comprising:

a reproduction unit configured to reproduce a moving image in a predetermined area;

a tracking unit configured to detect and track objects captured as a moving image;

a change unit configured to change a magnification of the moving image;

an enlargement unit configured to enlarge a target frame of the moving image on a basis of its center position corresponding to the magnification;

a first decision unit configured to decide groups including groups to which all the objects in the predetermined area belong in a case where at least one of the objects in the target frame enlarged by the enlargement unit go out from the predetermined area;

a second decision unit configured to decide a division number of a screen of the target frame corresponding to the number of groups decided;

a selection unit configured to select a layout structure that is constituted by divided screens corresponding to the division number; and a third decision unit configured to decide a layout of the groups to the divided screens of the selected layout structure, wherein the reproduction unit reproduces the moving image while changing the target frame into the decided layout.

10. The moving image reproducing apparatus according to claim 9, further comprising a calculation unit configured to calculate a distance between objects that go out from the predetermined area based on a tracking result by the tracking unit, wherein the first decision unit decides groups to which the objects that go out belong based on the distance calculated.

11. A control method for a moving image reproducing apparatus that is provided with a tracking unit that detects and tracks objects captured as a moving image and a change unit that changes a magnification of the moving image, the control method comprising:

a first obtaining step of obtaining position information about the objects detected by the tracking unit;

a calculation step of calculating distances between the objects based on the position information;

a first decision step of deciding a group to which each of the objects belongs based on a period during which the calculated distance is less than a threshold in the moving image;

a second decision step of deciding a division number of a screen of a target frame corresponding to the number of groups decided;

a selection step of selecting a layout structure that is constituted by divided screens corresponding to the division number;

a third decision step of deciding a layout of the groups to the divided screens of the selected layout structure; and a reproduction step of reproducing the moving image while changing the target frame into the decided layout.

12. A control method for a moving image reproducing apparatus that is provided with a reproduction unit that reproduces a moving image in a predetermined area, a tracking unit that detects and tracks objects captured as a moving image, and a change unit that changes a magnification of the moving image, the control method comprising:

an enlargement step of enlarging a target frame of the moving image on a basis of its center position corresponding to the magnification;

a first decision step of deciding groups including groups to which all the objects in the predetermined area belong in a case where at least one of the objects in the target frame enlarged by the enlargement unit goes out from the predetermined area;

a second decision step of deciding a division number of a screen of the target frame corresponding to the number of groups decided;

a selection step of selecting a layout structure that is constituted by divided screens corresponding to the division number;

a third decision step of deciding a layout of the groups to the divided screens of the selected layout structure; and a reproduction step of reproducing the moving image while changing the target frame into the decided layout.

13. A non-transitory computer-readable storage medium storing a control program causing a computer to execute a control method for a moving image reproducing apparatus that is provided with a tracking unit that detects and tracks objects captured as a moving image and a change unit that changes a magnification of the moving image, the control method comprising:

a first obtaining step of obtaining position information about the objects detected by the tracking unit, a calculation step of calculating distances between the objects based on the position information, a first decision step of deciding a group to which each of the objects belongs based on a period during which the calculated distance is less than a threshold in the moving image, a second decision step of deciding a division number of a screen of a target frame corresponding to the number of groups decided;

a selection step of selecting a layout structure that is constituted by divided screens corresponding to the division number;

a third decision step of deciding a layout of the groups to the divided screens of the selected layout structure; and a reproduction step of reproducing the moving image while changing the target frame into the decided layout.

14. A non-transitory computer-readable storage medium storing a control program causing a computer to execute a control method for a moving image reproducing apparatus that is provided with a reproduction unit that reproduces a moving image in a predetermined area, a tracking unit that detects and tracks objects captured as a moving image, and a change unit that changes a magnification of the moving image, the control method comprising:

an enlargement step of enlarging a target frame of the moving image on a basis of its center position corresponding to the magnification;

a first decision step of deciding groups including groups to which all the objects in the predetermined area belong in a case where at least one of the objects in the target frame enlarged by the enlargement unit goes out from the predetermined area;

a second decision step of deciding a division number of a screen of the target frame corresponding to the number of groups decided;

a selection step of selecting a layout structure that is constituted by divided screens corresponding to the division number;

a third decision step of deciding a layout of the groups to the divided screens of the selected layout structure; and a reproduction step of reproducing the moving image while changing the target frame into the decided layout.

* * * * *